May 19, 1953  H. H. VANDERZEE  2,638,996
POWER SUPPLY SYSTEM FOR SELF-PROPELLED VEHICLES
Original Filed Jan. 9, 1945  4 Sheets-Sheet 1

Inventor:
Harry H. Vanderzee.
by Louis A. Mapson.
Atty.

May 19, 1953     H. H. VANDERZEE     2,638,996
POWER SUPPLY SYSTEM FOR SELF-PROPELLED VEHICLES

Original Filed Jan. 9, 1945     4 Sheets-Sheet 2

Inventor:
Harry H. Vanderzee.
by
Louis A. Mapson
Atty.

May 19, 1953  H. H. VANDERZEE  2,638,996
POWER SUPPLY SYSTEM FOR SELF-PROPELLED VEHICLES
Original Filed Jan. 9, 1945  4 Sheets-Sheet 3
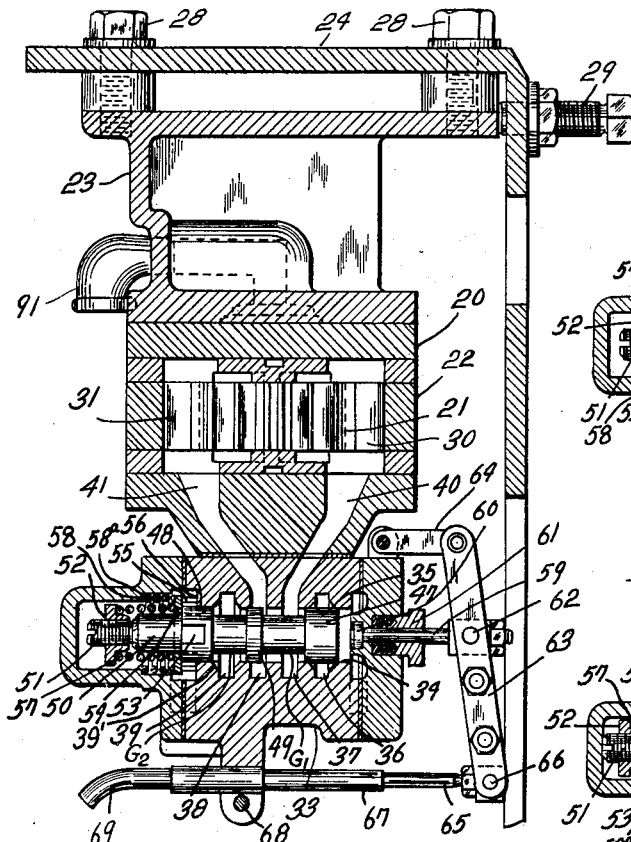
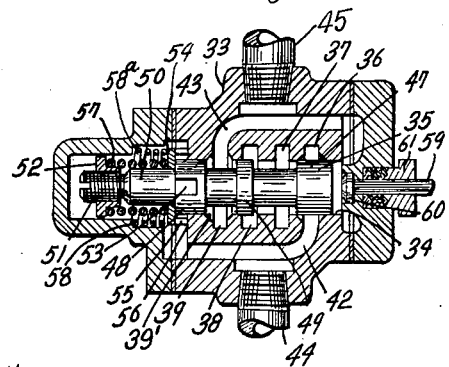
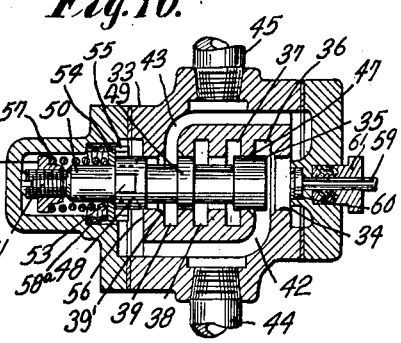
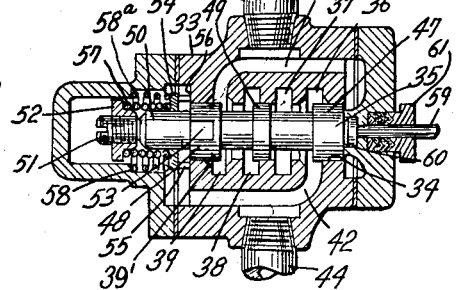
Inventor:
Harry H. Vanderzee.
by Louis A. Mahson.
Atty.

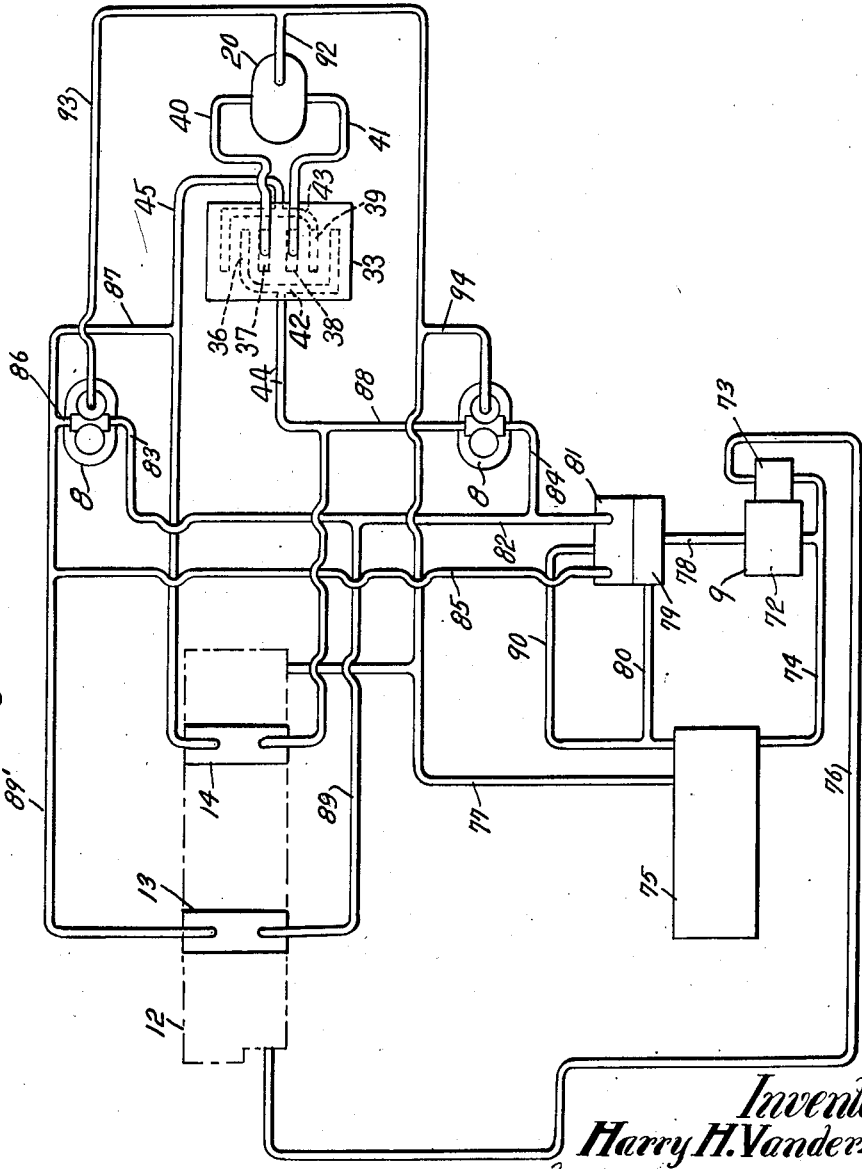

Patented May 19, 1953

2,638,996

UNITED STATES PATENT OFFICE 2,638,996

POWER SUPPLY SYSTEM FOR SELF-PROPELLED VEHICLES

Harry H. Vanderzee, Chicago, Ill., assignor to Joy Manufacturing Company, a corporation of Pennsylvania Original application January 9, 1945, Serial No. 571,991, now Patent No. 2,593,367, dated April 15, 1952. Divided and this application January 28, 1947, Serial No. 724,766

20 Claims. (Cl. 180—2)

This invention relates to vehicles having fluid operated propelling means and more particularly to vehicles having fluid operated propelling means and fluid operated reel-rotating means operable from a common source of fluid pressure.

In mining equipment such as mining machines used in coal mines, a reeling mechanism is usually associated with the mining machine for winding in and permitting the drawing off of the element which conducts power to the mining machine as the latter travels back and forth. As the mining machine moves forwardly from the main entry into a room, the power conductor element is desirably freely unwound from the reeling mechanism, and, as the mining machine backs from the room toward the main entry, the power conductor element is automatically wound in by the reeling mechanism. In the application, Serial No. 578,084, filed February 15, 1945, of Clyde P. Baldwin and myself, which application is a division of our earlier filed abandoned application Serial No. 378,728, filed February 13, 1941, and which application Serial No. 578,084 has now matured into Patent No. 2,562,881, there has been disclosed a hydraulically driven mining machine in which the cable reel is driven by a hydraulic motor through which and through a machine propulsion motor operating fluid passes in series as the machine moves towards a point of attachment of the cable, and in which the reel driving motor receives no operating fluid and has its supply and discharge connections directly connected to each other when the machine moves in the opposite direction. In that construction the tension applicable to the cable was controlled only by a slip clutch in the reel drive, and there was no provision for enabling reel driving when the machine was moving rearwardly.

An object of the present invention is to provide a fluid propelled vehicle having fluid operated reeling mechanism, embodying improvements over the mechanism of said joint application and all other combinations of vehicle wheel and cable reel propulsion mechanisms of which I am aware. Another object of my invention is to provide an improved fluid propelled vehicle having fluid operated reeling mechanism in which while there is provided mechanism for the power winding in of cable when the vehicle is moving in a given direction, there is also provided means under operator control by which cable may be drawn off at will during such movement of the vehicle. A further object of the invention is the provision of an improved fluid propelled vehicle having fluid operated reeling mechanism in which provision is made for the stalling of the reel drive or its actual reverse rotation due to the tension (excessive) of the cable, without the use of friction clutches and by virtue of the provision of appropriate fluid control valve means. Still another object of the invention is the provision of an improved fluid propelled vehicle having fluid operated reeling mechanism having improved control valve means associated with the fluid circuits whereby power reel drive may be interrupted by operator intervention at a time when automatic controls normally cause reel drive, and further having such improved valve means so constructed and arranged that the reel driving motor may either stall, or be actually caused to turn backwards due to the tension or torque exerted on the reel by the cable, when the resistance to winding in of the cable exceeds predetermined values. These and other objects and advantages of the invention will, however, hereinafter more fully appear.

In the accompanying drawings there is shown for purposes of illustration one form which the invention may assume in practice.

In these drawings:

Fig. 8 is a vertical sectional view, slightly enlarged, taken substantially on line 8—8 of Fig. 4.

Fig. 9 is a sectional view taken on line 9—9 of Fig. 4.

Figs. 10 and 11 are sectional views similar to Fig. 9, showing the control valve in different positions.

Fig. 12 is a fragmentary sectional view taken on the plane of Fig. 8, showing the control valve manually held in its by-passing position.

Fig. 13 is a diagrammatic view illustrating the hydraulic system.

Figure 1:
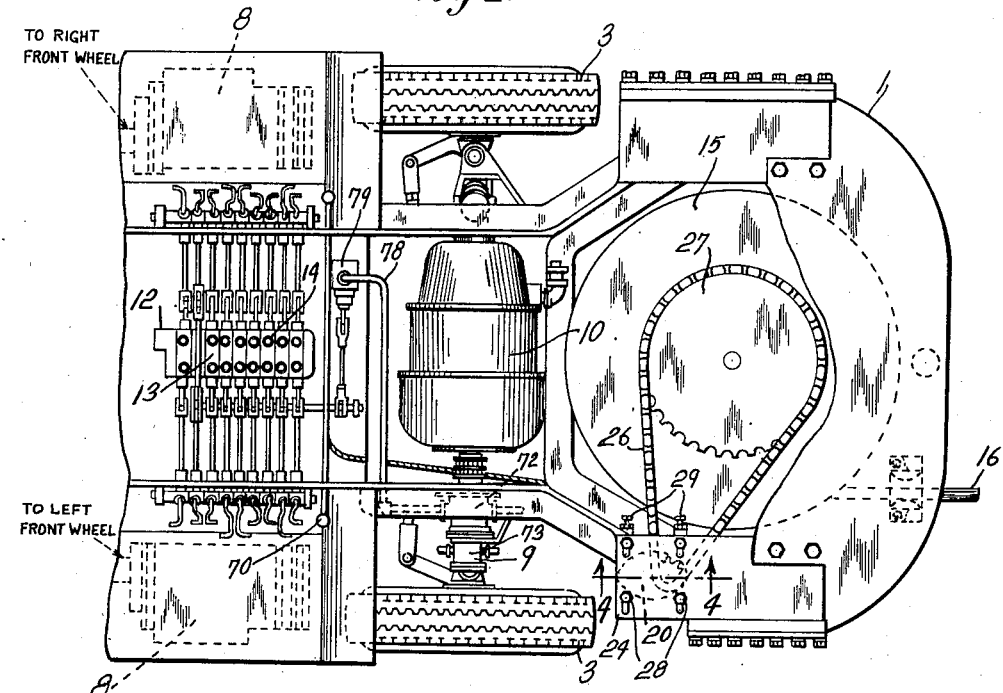
Fig. 1 is a plan view of the rear portion of a vehicle, herein a coal mining machine, in which the invention is incorporated in its illustrative form.

In this illustrative construction, the improved power conductor reeling mechanism is shown associated with a coal mining machine of the kerf cutting type, although it will be evident that the same may be associated with other types of mining or other equipment. The coal mining machine disclosed herein is of the rubber-tired universal type, especially designed for use in trackless coal mines, and may be generally similar to that shown in the above mentioned application Serial No. 378,728, filed February 13, 1941, and in Letters Patent No. 2,562,881 granted August 7, 1951, in each of which I am one of the co-inventors. While the machine disclosed is mounted on rubber-tired wheels adapted to travel along the floor of a mine without the aid of a guiding trackway, it will be obvious that the same may be provided with track engaging wheels or with endless traction treads in manners well known to those skilled in the art.

The coal mining machine disclosed herein comprises a portable base frame 1 mounted on rubber-tired wheels including front traction wheels 2 and rear steering wheels 3. Supported by the base frame and projecting forwardly therefrom is an elongated supporting structure or boom frame 4 carrying at its outer extremity an elongated plane kerf cutter 5. The boom frame 4 is mounted on the base frame to swing in horizontal and vertical directions with respect thereto in the manner fully described in the copending application above referred to, and includes an outer frame 6 rotatable about an axis extending longitudinally of the boom frame and a support 7 mounted on the rotatable frame 6 for tilting movement with respect thereto about an axis disposed at right angles to the longitudinal axis of the boom frame; and the kerf cutter 5 is pivotally mounted on the cutter support 7 to swing relative thereto about an axis at right angles to the axis of cutter support tilt. By adjusting the boom frame 4 either horizontally or vertically, by rotating the frame 6 and tilting the cutter support 7, the kerf cutter 5 may be located in any desired cutting position with respect to the working face of a coal seam, all in the manner fully described in the last above mentioned copending application. As is also fully described in the above mentioned copending application, the various adjustable parts of the mining machine are hydraulically operated and controlled, and the front traction wheels are independently driven by conventional reversible hydraulic motors 8, 8.

The hydraulic system of the mining machine, as shown in Fig. 13, which may be noted to be made after the nature of a top plan view so that certain parts appear differently from their disclosure in Figs. 9, 10 and 11, embodies a liquid pumping means 9 driven by a motor 10. In passing, it may be noted that the kerf cutter is driven by a motor 11 carried by the boom frame 4, as fully described in the above mentioned copending joint application. Carried by the mining machine is a valve box 12 containing manually operable valve devices for controlling the various hydraulically operated devices of the machine, and the valve device 13 controls the supply from a smaller pump, hereinafter described, to the traction wheel driving motors 8, while the valve device 14 controls the operation of the power conductor reeling mechanism, so far as this is effected by fluid from such smaller pump, as hereinafter explained.

Figure 2:
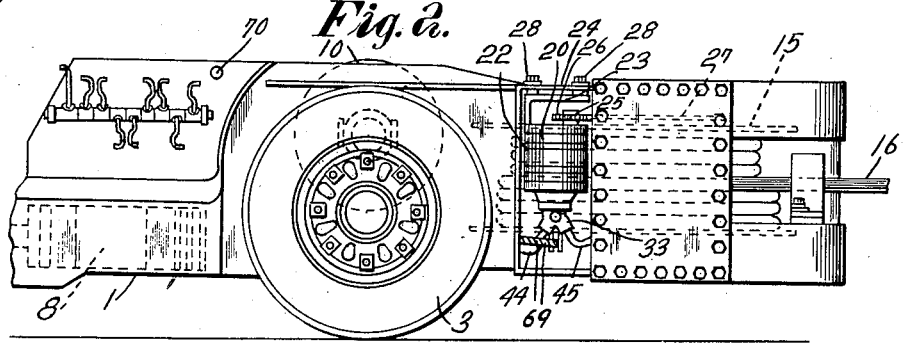
Fig. 2 is a side elevational view of the rearward portion of the mining machine shown in Fig. 1.

Now referring to the improved power conductor reeling mechanism, it will be noted that journaled for rotation on a vertical axis in a relatively low horizontal position on the rearward portion of the portable base frame, as shown in Figs. 1 and 2, is a power conductor reel 15, on which a power conductor element 16 is wound, this conductor element conducting motive power to the motors 10 and 11 of the mining machine. The motors 10 and 11 are herein preferably electric motors, and the power conductor element 16 is herein in the form of an electric cable for conducting electricity to the electric motors, and the conductor cable is connected in a well-known manner through usual contactor devices to conductor cables leading to the motors. Evidently, if desired, the mining machine motors may be fluid actuated and the power conductor cable on the reel may be replaced by a fluid supply hose.

Figure 4:
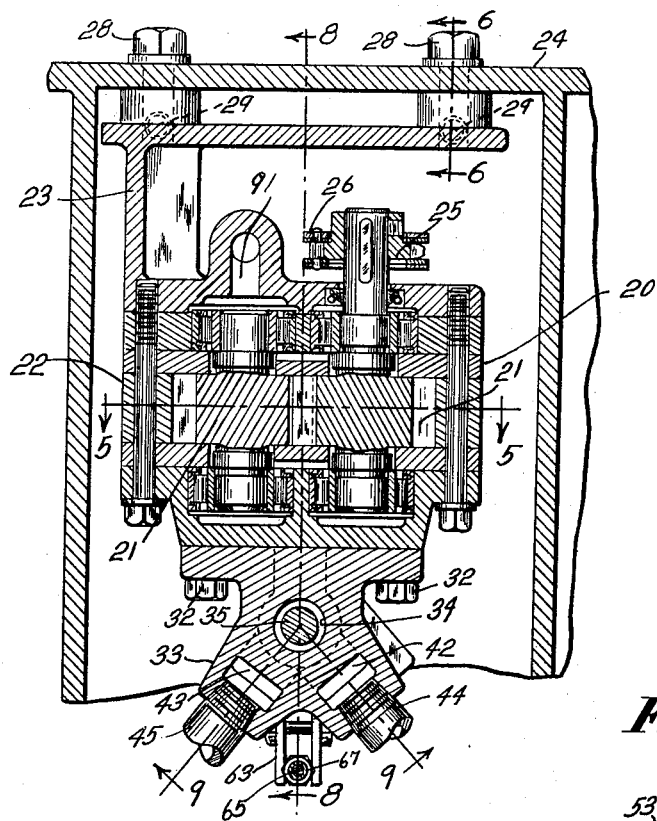
Fig. 4 is an enlarged vertical sectional view taken substantially on line 4—4 of Fig. 1.

The cable reel 15 may be driven in a direction to wind in the power conductor cable 16 by a hydraulic motor 20 (Figs. 4 and 5) comprising intermeshing rotors 21 journaled on parallel vertical axes within a casing 22, the latter being suspended by a bracket 23 from a horizontal top plate 24 of the machine base frame. Keyed to the upper end of one of the rotor shafts, as shown in Fig. 4, is a chain sprocket 25 connected by an endless drive chain 26 to a sprocket 27 suitably fixed to the reel drive shaft. The bracket 23 is secured by bolts 28 to the plate 24, and the plate is slotted to permit horizontal adjustment of the bracket when the bolts are loosened. Set screws 29 are provided for adjusting the bracket together with the motor casing with respect to the reel so that the chain 26 may have its tension adjusted as desired. After proper adjustment has been made, the bolts 28 may be tightened to secure the parts firmly in adjusted position.

Figure 7:
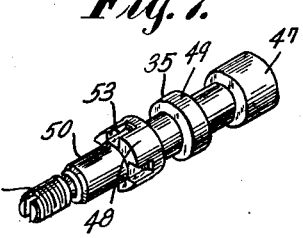
Fig. 7 is a perspective view of the control valve element.
Figure 5:
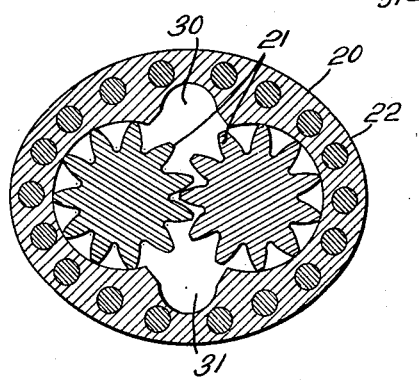
Fig. 5 is a horizontal sectional view taken on line 5—5 of Fig. 4.
Figure 6:
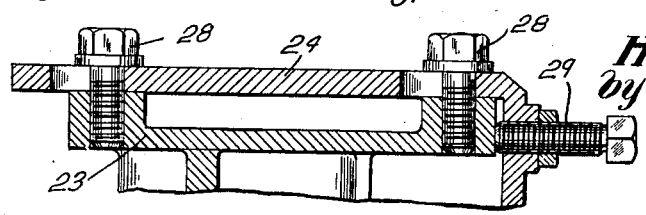
Fig. 6 is a detail vertical sectional view taken on line 6—6 of Fig. 4.

As shown in Figs. 5 and 8, the reel driving motor 20 has a liquid supply chamber 30 and a liquid exhaust chamber 31. Attached by screws 32 to the bottom of the motor casing 22 is a valve casing 33 having a horizontal bore 34 containing a control valve 35 of an improved design. The walls of the bore 34 are annularly grooved at 36, 37, 38 and 39, at longitudinally spaced points, and the intermediate grooves 37 and 38 are respectively connected by passages 40 and 41 to the liquid supply and exhaust chambers 30 and 31 of the motor. Communicating with the end grooves 36 and 39 are passages 42 and 43, connected respectively to conduits 44 and 45; and these conduits lead to the valve device 14 of the valve box 12 (Fig. 13). The valve 35 is of the sliding spool type and has end spools 47 and 48 and an intermediate spool 49, and has grooves $G_1$ and $G_2$ respectively between the spools 47 and 49 and between the spools 48 and 49; and projecting outwardly from the left-hand spool 48 (Figs. 7 and 8) is a reduced portion 50 threaded at 51 to receive an adjusting nut 52. The left-hand spool 48 is grooved at 53 longitudinally of the valve at spaced points about its periphery, and the groove 39 is countersunk at 39' around the bore 34, at its left-hand side, so that in certain positions of the control valve 35 the grooves 53 open into the groove 39, as shown in Fig. 11. A washer 54 surrounds the reduced portion 50 and is engageable with the outer end surface of the spool 48 in the manner shown in Fig. 8, and this washer has spaced projections 55 engageable with a surface 56 surrounding the left-hand end of the valve receiving bore 34. Interposed between the washer 54 and the nut 52 and surrounding the reduced valve portion 50 is a coil spring 57 for urging the washer toward the outer end surface of the valve spool 48. This nut 52 may be adjusted with respect to the valve to vary the tension of the coil spring 57. When the valve 35 moves toward the right into the position shown in Fig. 9, the washer projections 55 engage the surface 56, and further movement of the valve toward the right, i. e., toward the position shown in Fig. 11, is resisted by the spring 57. Interposed between a surface 58 on the valve casing and the washer 54 and surrounding the spring 57 is a spring 58ª which tends to hold the valve 35 in the neutral or central position shown in Fig. 8. For manually shifting the valve 35 toward the left, from the position shown in Fig. 8 into the position shown in Fig. 12, there is provided a plunger 59 coaxial with the valve and having an inner head 60 engageable with the right-hand end of the valve. This plunger projects outwardly through a stuffing box 61 from the valve casing and is pivotally connected at 62 to an operating lever 63, the latter in turn being pivotally connected by a loose link 64 to the valve casing. An operating shaft 65 is pivotally connected at 66 to the operating lever, and this shaft is guided in a tubular casing 67 secured at 68 to the bottom of the valve casing. The shaft 65 may be actuated through a conventional flexible shaft or Bowden wire 69 by an operating rod 70 located at the top of the machine base frame in adjacency to the valve box 12, as shown in Fig. 1.

As shown diagrammatically in Fig. 13, the pumping means 9 includes a large capacity pump 72 and a small capacity pump 73, and the pump intakes are connected by a suction line 74 to a liquid tank 75 carried by the machine base frame beneath the valve box 12. The small pump discharge is connected by a pressure line 76 to the supply passage of the valve box 12. The exhaust or return passage of the valve box 12 is connected by a return line 77 back to the tank. The discharge of the large capacity pump is connected by a pressure line 78 to a relief valve device 79. When the pressure in the line 78 becomes excessive, the relief valve device automatically connects the line 78 to a return line 80 leading to the tank. The pressure line 78 is connected to a four-way valve device 81, also fully described in the above mentioned copending application, and which is connected by a conduit 82 and branch conduits 83 and 84 to the traction wheel driving motors 8 at one side of the latter. Also leading from the four-way valve device 81 is a conduit 85 connected by a branch conduit 86 to the motor 8 shown near the top of Fig. 13, and through a branch conduit 87 to the conduit 45. The other side of the other wheel driving motor 8, shown in Fig. 13, is connected by a conduit 88 to the conduit 44. The conduits 82 and 85 are connected by branch conduits 89 and 89' to the valve device 13. The four-way valve device 81 is connected by a return line 90 back to the tank. As shown in Fig. 4, the reel driving motor 20 has a leak passage 91 to carry away any leakage of liquid, and the wheel driving motors 8 have similar leak passages. These leak passages are severally connected by branch conduits 92, 93 and 94 (see also Fig. 13) to the return line 77 so that any liquid leaking through these motors is conducted back to the tank.

The general mode of operation of the improved power conductor reeling mechanism is as follows: When the mining machine is to be propelled in a forward direction, for instance, from the main entry into a room, the free end of the conductor cable 16 is attached in the usual manner to the trolley line or lines, or to trolley line and rail in the main entry, and the four-way valve device 81 is positioned to supply liquid under pressure from the large pump 72 through the pressure line 78 and past the suitably adjusted four-way valve to the conduit 85 and branch conduit 86 to the upper one of the wheel driving motors 8, shown in Fig. 13, to effect forward propulsion. Concurrently, liquid under pressure flows through conduit 87 to conduit 45 and through passage 43 (see Fig. 10) to the valve receiving bore 34 at the right-hand end of the valve 35 and past the latter, which will then be displaced by the liquid to the position of Fig. 10, to passage 42 and conduit 44 and through conduits 44 and 88 to the supply side for forward propulsion of the bottom wheel driving motor 8, shown in Fig. 13. As a result, the motors 8 are concurrently operated in a direction to effect propulsion of a mining machine in a forward direction, i. e., to the left as viewed in Fig. 3. The discharge sides of the wheel driving motors 8 are connected through the branch conduits 83 and 84, conduit 82, through the four-way valve device 81 and return line 90 back to the tank 75. During such forward propulsion of the mining machine, the valve 35 is in the position shown in Fig. 10 so that the supply and exhaust passages 40 and 41 of the reel driving motor 20 are connected together by the valve 35, and, as a result, the liquid within the reel driving motor 20 may be freely circulated and thereby permit the conductor cable to freely unwind from the cable reel as the mining machine moves forwardly.

Figure 3:
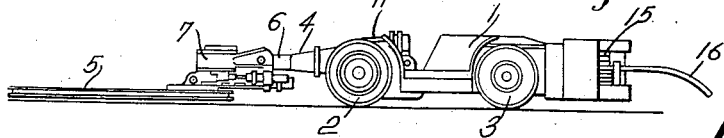
Fig. 3 is a side elevational view, on a reduced scale, of the complete mining machine.

When it is desired to reverse the direction of movement of the mining machine, i. e., to back the machine out of the room in a direction toward the right in Fig. 3, the four-way valve device 81 is adjusted to connect the conduit 82 with the pressure line 78 and to connect the conduit 85 with the return line 90, and, with the four-way valve device so positioned, liquid under pressure may flow from the large pump 72 through the pressure line 78 through the four-way valve device and through the conduit 82 and branch conduits 83 and 84 to the wheel driving motors 8 to operate the latter in a reverse direction. Exhaust from the motor 8 near the top of Fig. 13 flows freely back to the tank 75 through conduits 86 and 85, the valve device 81 and conduit 90. Concurrently, the exhaust side of the motor 8, shown at about the vertical center of Fig. 13, is connected by conduit 88 and conduit 44 to the passage 42 (see Fig. 9). The liquid in the passage 42 flows to the left-hand end of the valve casing 33 and acts on the left-hand end of the valve 35 to move the latter toward the right from the position shown in Fig. 9 towards the position shown in Fig. 11. Fluid may then pass, as later more fully described, to the groove 37, and effect reel drive in a winding direction. When the by-pass valve 35 is moved by the pressure of the liquid far enough towards the right (Fig. 11 shows the extreme right position of the valve), the grooves 53 in the left-hand valve spool 48 connect the passage 42 with the passage 43 so that some of the liquid may flow past the valve 35 to discharge. This event takes place when the volume of liquid flow through the passage 40 to the reel driving motor 20 is substantially less than that flowing to the valve casing through the conduit 44, to enable some of the liquid flowing to the valve casing to by-pass the valve to discharge. Liquid under pressure at this time normally flows through passage 42 past the valve 35 between the spools 47 and 49, through groove 37 and passage 40 to the supply chamber 30 of the reel driving motor 20, thereby causing the cable reel to be driven in a direction to wind in the conductor cable as the mining machine moves rearwardly. The exhaust from the reel driving motor 20 at this time flows through passage 41, through groove 38, past the valve 35 between the spools 49 and 48, through groove 39 and passage 43 to conduit 45 and thence to conduits 87 and 85, through the four-way valve device 81, and through return line 90 back to the tank. The exhaust from the upper wheel driving motor 8, shown in Fig. 13, is concurrently conducted, as above noted, through conduits 86 and 85, the four-way valve device, and the return line 90, to the tank. It is accordingly evident that when the mining machine is propelled in a forward direction by the wheel driving motors 8, the control valve 35 moves under the action of the liquid automatically into a position to effect free circulation of liquid through the reel driving motor so that the conductor cable may be freely unwound from the cable reel; and, when the mining machine is propelled in a rearward direction by the wheel driving motors, the reel driving motor 20 concurrently effects drive of the cable reel in a direction to wind in the conductor cable. If it be desired to enable free unwinding of the conductor cable while the mining machine is stationary, or, if it be desired to unwind the conductor cable during rearward movement of the mining machine, this may be accomplished simply by actuating the control rod 70 to swing the lever 63 in a direction to move the plunger 59 inwardly, i. e., to the left as viewed in Fig. 8, manually to shift the valve 35 to the position shown in Fig. 12 wherein the liquid in the reel driving motor is free to circulate, permitting the conductor cable to be freely drawn off as desired. Note that in the valve position of Fig. 12, fluid passing through pipe 44 into passage 42 may flow into passage 43 and to pipe 45 and so permit the lower motor 8 of Fig. 13 to exhaust, and so to operate.

When the conduits 82 and 85 are both closed by the four-way valve device 81, the valve device 13 may be manually operated to supply liquid under pressure from the small pump 73 through the pressure line 76 to the valve box 12 and through conduit 89, conduit 82 and branch conduits 83 and 84 to the wheel driving motors 8, to move the machine backwards, and concurrently, the reel driving motor 20 is operated to drive the reel in cable winding direction. Also the valve device 13 may be manipulated to supply liquid under pressure from the small pump to the wheel driving motors to effect forward propulsion of the machine, and at that time the liquid in the reel motor is automatically by-passed by the valve 35 to permit free unwinding of the cable from the reel. When the machine is stationary, the valve device 14 may be employed to effect rotation of the reel to wind in the cable. The motors 8 will not be operated, and the grooves 53 will, as valve 35 is automatically adjusted, vent all pressure above some predetermined value suited to effect reel drive with the desired torque.

Since the conduits 82 and 85 are respectively joined by the conduits 89 and 89', it will be evident that the large capacity pump 72 and the small capacity pump 73 may be used together to supply fluid for the propulsion and other functions performable by fluid from the pump 72 alone.

When the vehicle is being propelled in a so-called rearward direction—the direction in which it normally has the reel operated in a winding direction, and it goes past the mouth of a passageway out of which the cable extends from a point of connection with a source of current—normally the operator will operate the lever 63 and move the control valve 35 to the position of Fig. 12, and thus permit the cable to be pulled off of the reel freely, notwithstanding that the machine continues to travel in a direction in which cable would normally be wound in. Should he fail to do this, however, it is to be noted that, notwithstanding the absence of a slip clutch between the reel and its driving motor, the cable would not be ruined, because the reel driving motor would automatically be driven backwards as cable is pulled off of the reel, and would act as a pump, and the fluid it would circulate when so driven backwards would simply pass from groove 38 through the motor (operating as a pump), back to groove 37, through the latter into passage 42 and through the notches 53 which would then probably be opened very wide due to the additional quantity of fluid that would be passing.

Again it may be noted that if the traction wheels lost traction so that fluid was supplied to the reel driving motor in a direction to wind up the cable without, however, advance of the vehicle creating slack which could be wound in, injury to the cable would be prevented because the reel driving motor would simply stall and the fluid that would otherwise pass through it would go directly through the notches 53 to the passage 43 and the pipe 45.

It may further be noted that in order to permit the reel drive to be effected at an adequate, but not excessive, rate, there will desirably be some escape of fluid during rearward propulsion through the grooves 53 and any time the vehicle is moving rearwardly at a material angle to the direction of the taut cable, more fluid must be by-passed through the grooves 53 than when the path of the vehicle and the lead of the cable are in the same direction; also any time the relation between the lead of the cable and the path of the machine becomes such that, with the reel tending to wind in the cable, the cable must be lengthened to permit the machine to follow such path, then the reel driving motor will be driven backwards and any fluid it then pumps, plus the fluid from the propulsion motor theretofore in series with it, must pass through the notches. Referring again to the situation when some fluid passes through the reel driving motor and some is by-passed through the grooves 53, it will be evident that as the one flow is increased the other flow is diminished, and vice versa. The flows through these two courses therefore vary inversely.

From the foregoing description, it will be evident that I have provided an improved hydraulically propelled, hydraulic reel equipped vehicle having improved arrangements for preventing damage to the flexible power conducting element, having improved means for permitting paying out of cable when the vehicle is stationary or moving in a direction in which winding in of the cable would normally take place, and having improved manually and automatically controlled valve mechanism associated with the wheel and reel propulsion fluid circuits providing for controls not heretofore attained so far as I am advised.

This application is a division of my application Serial No. 571,991, filed January 9, 1945 for Reeling Mechanism, which application has matured into Patent No. 2,593,367, granted April 15, 1952.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, in a fluid propelled vehicle, fluid operated propelling means, a pump for supplying operating fluid to said propelling means, said pump having a driving motor, a reel having thereon a cable by which operating medium for said motor is transmitted to the latter, fluid operated reel rotating means, and means for effecting serial flow of operating fluid through said fluid operated propelling means and through said reel rotating means and for effecting the automatic by-passing of the major portion of the fluid passing through said propelling means without entering the reel rotating means when resistance to reel rotation exceeds a predetermined amount, said last mentioned means including a valve controlling fluid by-passing, means for subjecting it to the fluid passing through said propelling means to provide a valve shifting force, and yieldable means for opposing such force.

2. In an apparatus of the character described, the combination comprising a portable base, a pump on said base having an intake and a discharge, driving means for said pump, a conductor for conducting operating medium to said driving means, a reel for said conductor, a hydraulic driving motor for said reel having supply and exhaust connections, propelling means for said base including a reversible hydraulic propulsion motor, a sump, a connection from said sump to the intake of said pump, and means for selectively conducting fluid from the discharge of said pump in series through said motors and back to the sump, thereby effecting propulsion motor drive in one direction, or conducting fluid from the pump discharge through said propulsion motor only, in a direction to effect drive thereof in an opposite direction, and back to the sump, while interconnecting the supply and exhaust connections of said reel driving motor, said last mentioned means including a valve casing having a valve-receiving bore with which the supply and exhaust connections of said reel driving motor connect at mutually spaced points, fluid conduits each connecting one end of the bore freely with the bore at a point spaced from both ends of the latter, said last mentioned points being spaced from each other and having between them the spaced points of connection of the reel driving motor supply and exhaust, and other conduits, selectively serving as fluid supply or fluid exhaust conduits, connected one with each of said first mentioned conduits, the valve in said bore positionable to interconnect the supply and exhaust connections of the reel driving motor, and, in other positions, to conduct all the fluid from the pump discharge to the reel driving motor, or only part thereof to the reel driving motor and the rest to the sump.

3. In an apparatus of the character described, the combination comprising a portable base, a pump on said base having an intake and a discharge, driving means for said pump, a conductor for conducting operating medium to said driving means, a reel for said conductor, a hydraulic driving motor for said reel having supply and exhaust connections, propelling means for said base including a reversible hydraulic propulsion motor, a sump, a connection from said sump to the intake of said pump, and means for selectively conducting the entire volume of fluid discharged by said pump through said motors in series or all thereof through one of said motors and in part through the other and in part past the other, and in each case back to the sump, thereby effecting propulsion motor drive in one direction and reel drive in a winding direction, or conducting fluid from the pump discharge through said propulsion motor only, in a direction to effect drive thereof in an opposite direction, and back to the sump, while interconnecting the supply and exhaust connections of said reel driving motor, said last mentioned means including a valve element having therein a conduit which alternatively, in different positions of said valve element, interconnects the supply and exhaust connections of the reel driving motor and conducts fluid to said reel driving motor and a conduit for by-passing a portion of the fluid flowing towards the reel driving motor.

4. In an apparatus of the character described, the combination comprising a portable base, propelling means for said base including a reversible hydraulic propulsion motor, a pump having an intake and a discharge, a driving motor for said pump, a conductor for conducting operating medium to said driving motor, a reel for said conductor, a hydraulic driving motor for said reel having supply and exhaust connections, a sump, a connection from said sump to the intake of said pump, and means for selectively conducting fluid from the discharge of said pump in series through said propulsion motor in one direction and through said reel driving motor and back to the sump or for conducting fluid from said pump discharge through said propulsion motor only, and in the opposite direction through the latter, and back to the sump, while interconnecting the supply and exhaust connections of said reel driving motor, said last mentioned means including a valve automatically shifted by fluid pressure to positions in which fluid respectively is and is not supplied to said reel driving motor, and having manual means associated with it for shifting it from a position in which fluid is supplied to said reel driving motor to a position in which the supply and exhaust connections of said motor are interconnected.

5. In an apparatus of the character described, the combination comprising a portable base, propelling means for said base including a reversible hydraulic propulsion motor, a pump having an intake and a discharge, a driving motor for said pump, a conductor for conducting operating medium to said driving motor, a reel for said conductor, a hydraulic driving motor for said reel having supply and exhaust connections, a sump, a connection from said sump to the intake of said pump, means for selectively conducting fluid from the discharge of said pump through said propulsion motor and in part through said reel driving motor and back to the sump and in part past said reel driving motor and back to the sump, or for conducting fluid from said pump discharge through said propulsion motor only, and in the opposite direction through the latter, and back to the sump while interconnecting the supply and exhaust connections of said reel driving motor, said last mentioned means including valve means having oppositely facing areas associated therewith, means for normally yieldingly maintaining said valve means in a position preventing flow past the same in either direction, and means for subjecting said areas to the opposite flows of fluid relative to said propulsion motor.

6. In an apparatus of the character described, the combination comprising a portable base, propelling means for said base including a reversible hydraulic propulsion motor, a pump having an intake and a discharge, a driving motor for said pump, a conductor for conducting operating medium to said driving motor, a reel for said conductor, a hydraulic driving motor for said reel having supply and exhaust connections, a sump, a connection from said sump to the intake of said pump, means for selectively conducting fluid from the discharge of said pump in one direction through said propulsion motor and in part through said reel driving motor and back to the sump and, concurrently, in part past said reel driving motor and back to the sump, or for conducting fluid from said pump discharge through said propulsion motor only, and in the opposite direction through the latter, and back to the sump while interconnecting the supply and exhaust connections of said reel driving motor, and means for connecting said pump discharge to the supply connection of said reel driving motor and connecting the exhaust connection of said reel driving motor to the sump while no fluid passes through said propulsion motor.

7. In an apparatus of the character described, the combination comprising a portable base, propelling means for said base including a reversible hydraulic propulsion motor, a pump having an intake and a discharge, a driving motor for said pump, a conductor for conducting operating medium to said driving motor, a reel for said conductor, a hydraulic driving motor for said reel having supply and exhaust connections, a sump, a connection from said sump to the intake of said pump, and means for selectively conducting fluid from the discharge of said pump through said propulsion motor in one direction and then through said reel driving motor, so that the fluid flows through said motors in series, and then back to the sump, or for conducting fluid from said pump discharge past said reel driving motor and in the opposite direction through said propulsion motor and back to the sump, while interconnecting the supply and exhaust connections of said reel driving motor, said last mentioned means including a valve having automatic controlling means for positioning it to effect such series flow when fluid is supplied in said one direction to said propulsion motor, and having manual means for moving it to connect the supply and exhaust connections of the reel driving motor while fluid flow to said propulsion motor continues in said one direction.

8. In an apparatus of the character described, the combination comprising a portable base, propelling means for said base including a reversible hydraulic propulsion motor, a plurality of pumps each having an intake and a discharge, driving means for said pumps, a conductor for conducting operating medium to the driving means for said pumps, a reel for said conductor, a hydraulic driving motor for said reel having supply and exhaust connections, a sump, connections from said sump to the intakes of said pumps, and means, including operator and flow controlled valves, for selectively conducting fluid from the discharge of either of said pumps through said propulsion motor in one direction and then, in proportions determined by the quantity that the operation of said reel driving motor will take, past the reel driving motor and back to the sump and through said reel driving motor, so that the fluid flows through said motors in series, and then back to the sump, or for conducting fluid from either of said pump discharges past said reel driving motor and in the opposite direction through said propulsion motor and back to the sump, while interconnecting the supply and exhaust connections of said reel driving motor.

9. In an apparatus of the character described, the combination comprising a portable base, propelling means for said base including a reversible hydraulic propulsion motor, a plurality of pumps each having an intake and discharge, driving means for said pumps, a conductor for conducting operating medium to the driving means for said pumps, a reel for said conductor, a hydraulic driving motor for said reel having supply and exhaust connections, a sump, connections from said sump to the intakes of said pumps, and means for selectively conducting fluid from the discharge of either of said pumps through said propulsion motor in one direction and then through said reel driving motor so that the fluid flows through said motors in series and then back to the sump or for conducting fluid from either of said pump discharges past said reel driving motor and in the opposite direction through said propulsion motor and back to the sump, while interconnecting the supply and exhaust connections of said reel driving motor, said last mentioned means including means for automatically by-passing, past the reel driving motor, all or a part of the fluid passing said propulsion motor on its way to said reel driving motor, in accordance with the operation of said reel driving motor.

10. In an apparatus of the character described, the combination comprising a portable base, propelling means for said base including a reversible hydraulic propulsion motor, a plurality of pumps each having an intake and discharge, driving means for said pumps, a conductor for conducting operating medium to the driving means for said pumps, a reel for said conductor, a hydraulic driving motor for said reel having supply and exhaust connections, a sump, connections from said sump to the intakes of said pumps, and means for selectively conducting fluid from the discharge of either or both of said pumps through said propulsion motor in one direction and then through said reel driving motor so that the fluid flows through said motors in series and then back to the sump or for conducting fluid from either or both of said pump discharges past said reel driving motor and in the opposite direction through said propulsion motor and back to the sump, while interconnecting the supply and exhaust connections of said reel driving motor, said last mentioned means including means for automatically by-passing, past the reel driving motor, all or a part of the fluid passing said propulsion motor on its way to said reel driving motor, in accordance with the operation of said reel driving motor.

11. In an apparatus of the character described, the combination comprising a portable base, propelling means for said base including a reversible hydraulic propulsion motor, a plurality of pumps each having an intake and discharge, driving means for said pumps, a conductor for conducting operating medium to the driving means for said pumps, a reel for said conductor, a hydraulic driving motor for said reel having supply and exhaust connections, a sump, connections from said sump to the intakes of said pumps, and means for selectively conducting fluid from the discharge of either or both of said pumps through said propulsion motor in one direction and then through said reel driving motor so that the fluid flows through said motors in series and then back to the sump or for conducting fluid from either or both of said pump discharges past said reel driving motor and in the opposite direction through said propulsion motor and back to the sump, while interconnecting the supply and exhaust connections of said reel driving motor, said last mentioned means including manually controlled means for by-passing past said reel driving motor all of the fluid on its way thereto through said propulsion motor.

12. In an apparatus of the character described, the combination comprising a portable base, propelling means for said base including a hydraulic propulsion motor, a pump, a driving motor for said pump, a conductor conducting operating medium to said driving motor, a reel for said conductor, a hydraulic driving motor for said reel, and means for effecting the delivery of operating fluid to said propelling motor and to said reel driving motor including means for causing operating fluid to flow through both of the same simultaneously to effect winding in of said conductor while said portable base is moving in a direction towards which said conductor extends from said reel, said last mentioned means including valve means controllable by the fluid which it controls and having oppositely facing areas subjected to such fluid to effect changes in valve positioning and having also operator controllable operating means for interrupting winding in operation of said reel driving motor while movement of said portable base in the same direction continues.

13. In an apparatus of the character described, the combination comprising a portable base, propelling means for said base including a hydraulic propulsion motor, a pump, a driving motor for said pump, a conductor conducting operating medium to said driving motor, a reel for said conductor, a hydraulic driving motor for said reel, and means for effecting the delivery of operating fluid to said propulsion motor and to said reel driving motor including means for causing operating fluid to flow through both of the same simultaneously to effect winding in of said conductor while said portable base is moving in a direction towards which said conductor extends from said reel, and means governed by the resistance to winding in of said conductor for interrupting winding in operation of said reel driving motor while movement of said portable base in the same direction continues, the first of the last two means mentioned including a fluid actuated valve and the other of said last two means mentioned including means for yieldingly resisting movement of said valve beyond a predetermined position of the latter.

14. In an apparatus of the character described, the combination comprising a portable base, propelling means for said base including a hydraulic propulsion motor, a pump, a driving motor for said pump, a conductor conducting operating medium to said driving motor, a reel for said conductor, a hydraulic driving motor for said reel having opposite sides, and means for delivering operating fluid from said pump to said propulsion motor and to said reel driving motor simultaneously to effect winding-in of said conductor while said portable base is moving in a direction towards which said conductor extends from said reel, including means for automatically enabling said reel driving motor to be driven as a pump and reverse the flow of fluid therethrough in the event that paying out of said conductor is necessitated by continued base movement in such direction including a casing having a bore, conduit means connecting spaced points in said bore with the opposite sides of said reel driving motor, a valve in said bore movable between opposite extreme positions, and further conduits in said casing constituting alternative fluid supply connections for said bore and each acting as a discharge from said bore when the other acts as a supply connection, said valve having peripheral means for serving for the passage of fluid flowing between the opposite sides of said reel driving motor in each of said valve's opposite extreme positions in said bore, said valve in one of the opposite extreme positions thereof connecting the opposite sides of the reel driving motor with each other and permitting flow between said conduits which constitute alternative fluid supply connections and in the other extreme position thereof establishing connections between said conduits through the reel driving motor and in by-pass relation to the latter.

15. In an apparatus of the character described, the combination comprising a portable base, propelling means for said base including a hydraulic propulsion motor, a pump, a driving motor for said pump, a conductor conducting operating medium to said driving motor, a reel for said conductor, a hydraulic driving motor for said reel, and means for effecting the delivery of operating fluid to said propulsion motor and to said reel driving motor including means for causing operating fluid to flow through both of the same simultaneously to effect winding in of said conductor while said portable base is moving in a direction towards which said conductor extends from said reel, and means including a valve having an uncounterbalanced pressure area subjected to fluid passing to said reel driving motor for automatically enabling said reel driving motor to be driven as a pump and reverse the flow of fluid therethrough in the event that paying out of said conductor is necessitated by continued base movement in such direction.

16. In an apparatus of the character described, the combination comprising a portable base, propelling means for said base including a reversible hydraulic propulsion motor, a pump having an intake and a discharge, driving means for said pump, a conductor conducting operating medium to said pump driving means, a reel for said conductor, a hydraulic driving motor for said reel having supply and exhaust connections, a sump, a connection from said sump to the intake of said pump, and means for selectively conducting fluid from the discharge of said pump in series through said motors and back to the sump or for conducting fluid from said pump discharge through said propulsion motor only, but in the opposite direction from that in which the fluid flows when passing in series through said motors, and back to the sump, while interconnecting the supply and exhaust connections of said reel driving motor, said last mentioned means including a valve having positions in which it respectively (a) conducts fluid from the discharge of the pump to the reel driving motor and connects the exhaust of the reel driving motor to the sump, (b) connects the discharge of the pump with the sump when the reel driving motor is stalled, and (c) connects with the sump both the discharge of the pump and the discharge of the reel driving motor when the latter is driven backwards and caused to act as a pump by tension on the conductor, said valve having associated with it means for increasingly opposing its movement as it moves successively to said positions, means for subjecting a surface on said valve to the fluid pressures against which said pump discharges, and conduit means formed on said valve for effecting said second and third mentioned connections.

17. In an apparatus of the character described, the combination comprising a portable base, propelling means for said base including a reversible hydraulic propulsion motor, a pump having an intake and a discharge, driving means for said pump, a conductor conducting operating medium to said pump driving means, a reel for said conductor, a hydraulic driving motor for said reel having supply and exhaust connections, a sump, a connection from said sump to the intake of said pump, and means for selectively (1ª) interconnecting the supply and exhaust connections of the reel driving motor and (1ᵇ) effecting connections for the flow of fluid from the pump discharge through the propulsion motor only for causing rotation of the latter in one direction, or (2ª) effecting connections for the flow of fluid from the pump discharge in series through the propulsion motor and the reel driving motor to effect rotation of the former in the other direction and of the latter in a winding direction, and (2ᵇ) effecting, in accordance with variations in resistance to drive of said reel driving motor, the passage through the reel driving motor of all the fluid traversing the propulsion motor or the passage of a less quantity of fluid through the reel driving motor than passes through the propulsion motor, and having the rest by-pass the reel driving motor, said means including a valve casing having connections with the supply and exhaust connections of the reel driving motor and connections each serving for the delivery of fluid in one direction and, while the other so serves, serving for the passage of fluid from said valve casing, and a valve in said casing selectively connecting the supply and exhaust connections of the reel driving motor with each other, or connecting the reel driving motor between said other connections, and further having thereon a conduit for interconnecting said other connections while the reel driving motor is connected between said other connections.

18. In combination, a portable base having thereon a propulsion motor, a reel, and a reel driving motor, each of said motors hydraulically operable, a sump, a pump for supplying fluid from said sump to said motors, a driving motor for said pump, a conductor for power medium for said pump driving motor wound on said reel, means for conducting fluid from said pump to said propulsion motor, and, in inversely varying quantities, determined by the resistance to reel rotation, through said reel driving motor or past the same to the sump, and means for at will causing all of said fluid to by-pass said reel driving motor.

19. In combination, a portable base having thereon a propulsion motor, a reel, and a reel driving motor, each of said motors hydraulically operable, a sump, a pump for supplying fluid from said sump to said motors, a driving motor for said pump, a conductor for power medium for said pump driving motor wound on said reel, and means for conducting fluid from said pump to said propulsion motor, and, in inversely varying quantities, through said reel driving motor or past said reel driving motor to the sump including a control valve having spaced fluid-conducting means thereon for the fluid passing through the reel driving motor and past the same to the sump.

20. In combination, a portable base having thereon a propulsion motor, a reel, and a reel driving motor, each of said motors hydraulically operable, a sump, a pump for supplying fluid from said sump to said motors, a driving motor for said pump, a conductor for power medium for said pump driving motor wound on said reel, and means, including a valve having thereon means for conducting fluid in separate streams to the reel driving motor and to the sump and means for rendering said valve responsive to the pressure of the latter stream, for conducting fluid from said pump to said propulsion motor, and, in inversely varying quantities, through said reel driving motor or past the same to the sump.

HARRY H. VANDERZEE.

References Cited in the file of this patent

UNITED STATES PATENTS

| Number | Name | Date |
|---|---|---|
| 1,045,903 | Smith | Dec. 3, 1912 |
| 2,112,466 | Maloon | Mar. 29, 1938 |
| 2,209,608 | Nye | July 30, 1940 |
| 2,229,086 | Joy | Jan. 21, 1941 |
| 2,292,278 | Lorenz | Aug. 4, 1942 |
| 2,301,098 | Twyman | Nov. 3, 1942 |
| 2,384,447 | Baldwin et al. | Sept. 11, 1945 |
| 2,403,325 | Armington | July 2, 1946 |
| 2,562,881 | Baldwin et al. | Aug. 7, 1951 |